United States Patent
Taylor et al.

(10) Patent No.: US 11,265,386 B2
(45) Date of Patent: *Mar. 1, 2022

(54) LOCATION AWARE AUTHORIZATION SYSTEM

(71) Applicant: Comcast Cable Communications, LLC, Philadelphia, PA (US)

(72) Inventors: James C. Taylor, Bloomington, MN (US); Anil K. Khanna, Englewood, CO (US); Jasbir Rajpal, Parker, CO (US); Venugopal Rao Mudigonda, Parker, CO (US); Nirav Dave, Highlands Ranch, CO (US); Padmini Bettadapura, Highlands Ranch, CO (US); Benjamin Lieberman, Littleton, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/674,114

(22) Filed: Nov. 5, 2019

(65) Prior Publication Data

US 2020/0267226 A1 Aug. 20, 2020

Related U.S. Application Data

(63) Continuation of application No. 14/201,237, filed on Mar. 7, 2014, now Pat. No. 10,506,053.

(51) Int. Cl.
| | |
|---|---|
| *H04L 29/08* | (2006.01) |
| *H04L 67/52* | (2022.01) |
| *H04W 4/02* | (2018.01) |
| *H04W 48/04* | (2009.01) |
| *H04W 4/029* | (2018.01) |
| *H04W 12/08* | (2021.01) |
| *H04L 29/06* | (2006.01) |
| *H04W 4/30* | (2018.01) |

(Continued)

(52) U.S. Cl.
CPC ............ *H04L 67/18* (2013.01); *H04L 63/107* (2013.01); *H04W 4/023* (2013.01); *H04W 4/029* (2018.02); *H04W 4/30* (2018.02); *H04W 12/08* (2013.01); *H04W 48/04* (2013.01); *H04W 12/63* (2021.01); *H04W 12/67* (2021.01)

(58) Field of Classification Search
CPC ........ H04L 67/18; H04L 63/107; H04W 4/30; H04W 12/08; H04W 4/029; H04W 4/023; H04W 48/04; H04W 12/00505; H04W 12/00503
See application file for complete search history.

(56) References Cited

U.S. PATENT DOCUMENTS 6,195,556 B1  2/2001  Reudink et al.
7,936,872 B2 * 5/2011  Krumm ................ H04W 8/005
                                               380/34

(Continued)

*Primary Examiner* — Meng Li
(74) *Attorney, Agent, or Firm* — Banner & Witcoff, Ltd.

(57) ABSTRACT

Methods, computing devices, and systems that dynamically determine whether a service request is authorized or fraudulent are described herein. A computing device may receive a request from a user device, and a geographical location of the user device may be determined based on a signal received from the user device. A determination as to whether to activate the service or not may be made based on the determined geographical location of the user device.

17 Claims, 10 Drawing Sheets

(51) Int. Cl.
 *H04W 12/63* (2021.01)
 *H04W 12/67* (2021.01)

(56) References Cited

U.S. PATENT DOCUMENTS

| | | | |
|---|---|---|---|
| 8,554,912 B1* | 10/2013 | Reeves | H04W 12/1206 709/225 |
| 2005/0251326 A1* | 11/2005 | Reeves | H04L 67/16 701/519 |
| 2006/0038677 A1* | 2/2006 | Diener | H04B 17/345 340/540 |
| 2006/0149674 A1 | 7/2006 | Cook et al. | |
| 2008/0057957 A1 | 3/2008 | Altbaum et al. | |
| 2008/0070572 A1* | 3/2008 | Shkedi | G01S 5/0252 455/435.1 |
| 2008/0072241 A1* | 3/2008 | Cohen | H04L 41/0893 719/317 |
| 2008/0109512 A1 | 5/2008 | Zhou et al. | |
| 2009/0089838 A1* | 4/2009 | Pino, Jr | H04N 21/4788 725/40 |
| 2009/0100128 A1 | 4/2009 | Czechowski, III et al. | |
| 2009/0116447 A1 | 5/2009 | Balasubramanian et al. | |
| 2010/0058053 A1 | 3/2010 | Wood et al. | |
| 2011/0053492 A1 | 3/2011 | Hochstein | |
| 2011/0088074 A1 | 4/2011 | Harp et al. | |
| 2011/0291814 A1* | 12/2011 | Faith | G06Q 20/3224 340/10.5 |
| 2012/0044089 A1 | 2/2012 | Yarnold et al. | |
| 2013/0063309 A1 | 3/2013 | Natucci et al. | |
| 2014/0198687 A1* | 7/2014 | Raleigh | G06Q 40/00 370/259 |
| 2015/0237596 A1* | 8/2015 | Carlsson | G08G 1/0129 455/456.1 |

* cited by examiner

LOCATION AWARE AUTHORIZATION SYSTEM

CROSS-REFERENCE TO RELATED APPLICATIONS

This application is a continuation of and claims priority to U.S. application Ser. No. 14/201,237, which was filed Mar. 7, 2014, entitled "Location Aware Security System", now allowed, which application is incorporated herein by reference in its entirety.

BACKGROUND

In providing services, a provider may implement systems to detect fraud and/or abuse by users. The systems may be easy to manipulate, for example, to gain access or to fraudulently become an authorized user.

Additionally, since service requests may be requested remotely such as via telephone or over a network, real-time information is needed to make a determination of whether the user is authorized to access or use a specific service before authorizing activation.

Thus, there exists a need for a system that is more difficult to manipulate and provides real-time decision making information as to whether to authorize a user for a requested service.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects of this disclosure relate to methods, systems and computing devices that enable a proactive determination of whether an activation request is authorized or fraudulent.

In some aspects, a determination may be made as to whether to authorize or activate a service or device in response to a risk value (associated with a user (e.g., subscriber) or a device). The user risk value can be calculated based on a geographical location of the communication device. The geographical location of the communication device may be determined based at least in part on the activation request, communication device information, and/or user information. Depending on the subscriber risk value or a risk level, a determination can be made as to whether provisioning or activation should be enabled. If activation is not enabled, an alert about a potential fraud or abuse may be transmitted to a security terminal, monitor, or associated security personnel.

In another aspect, the geographical location of the communication device may be determined based on a network connection of the communication device and an analysis of the signal transmitted from the communication device. The analysis of the signal transmitted from the communication device may be a comparison of radio frequency signals from the communication device and a communication device located in a neighboring premises.

In some aspects, the user risk value may be calculated based on various primary components. Examples of primary components include a location component, a device component, a network component, and a finance component. A correlation between the user risk value and a predetermined risk value may be used to select a risk level. The user risk value and the predetermined risk value may be presented in the form of a score or a graphical pattern.

The methods, systems and computing devices described herein may be included as part of a network, such as an information access network or a content (e.g., television) distribution network.

The details of these and other embodiments of the present disclosure are set forth in the accompanying drawings and the description below. Other features and advantages will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
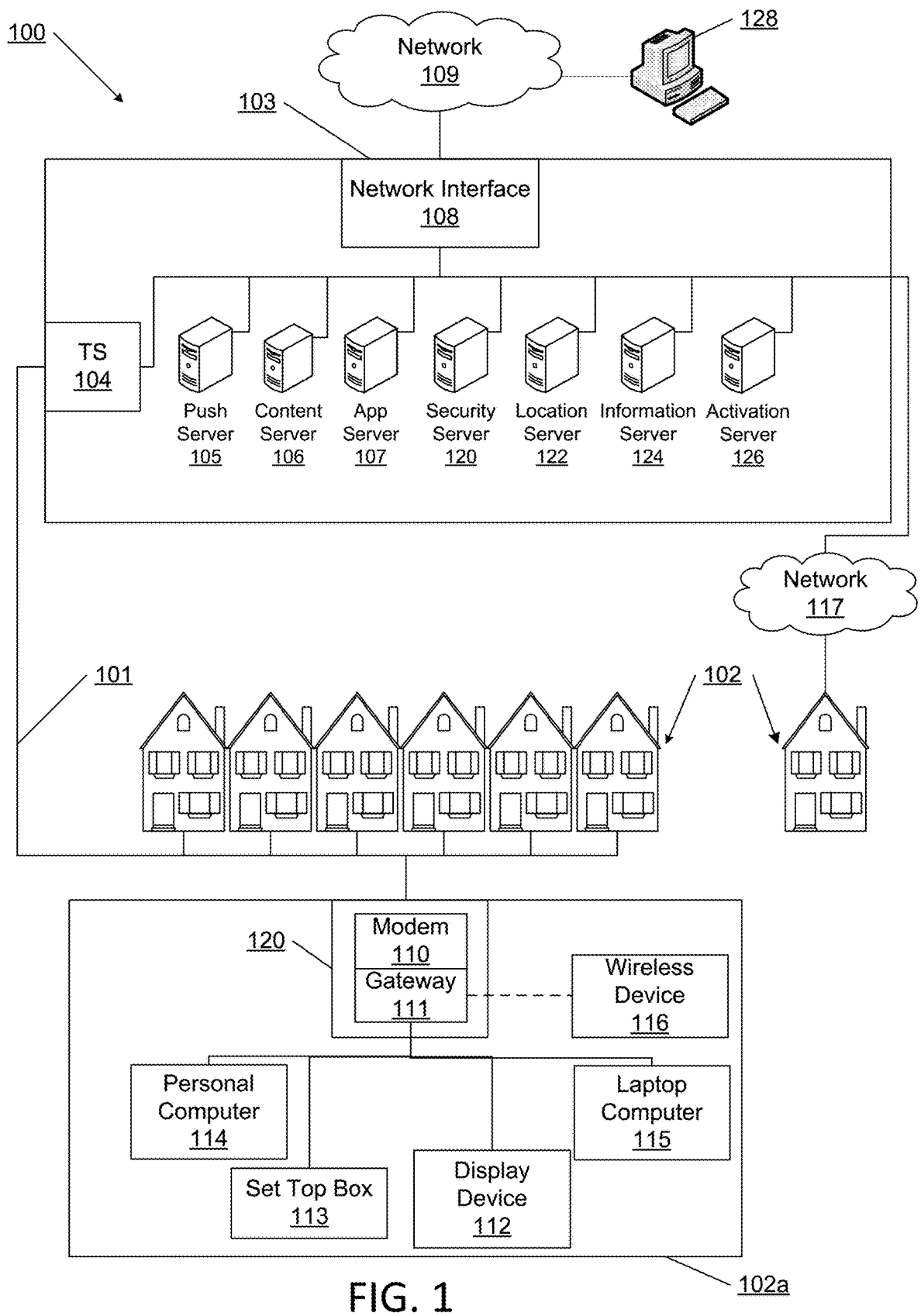
FIG. 1 illustrates an example network according to one or more aspects described herein.

FIG. 1 illustrates an example network 100 on which many of the various features described herein may be implemented. Network 100 may be any type of information distribution network, such as satellite, telephone, cellular, wireless, optical fiber network, coaxial cable network, and/or a hybrid fiber/coax (HFC) distribution network. Additionally, network 100 may be a combination of networks. Network 100 may use a series of interconnected communication links 101 (e.g., coaxial cables, optical fibers, wireless, etc.) and/or some other network 117 (e.g., the Internet) to connect an end-point to a local office or headend 103. Example end-points are illustrated in FIG. 1 as premises 102 (e.g., businesses, homes, consumer dwellings, etc.). The local office 103 (e.g., a data processing and/or distribution facility) may transmit information signals onto the links 101, and each premises 102 may have a receiver used to receive and process those signals.

There may be one link 101 originating from the local office 103, and it may be split a number of times to distribute the signal to various homes 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other links, or wireless communication paths.

The local office 103 may include a termination system (TS) 104, such as a cable modem termination system (CMTS) in a HFC network, which may be a computing device configured to manage communications between devices on the network of links 101 and backend devices such as servers 105-107 (to be discussed further below). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems or other user devices at the various premises 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various homes 102 in the network (or more specifically, to the devices in the homes 102 that are configured to detect such notifications). The local office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for formatting and providing data for an interactive service being transmitted to the premises 102 (e.g., chat messaging service, etc.).

The local office 103 may further include a security server 120, a location server 122, an information server 124, and an activation server 126. A security terminal 128 may be included at the local office 103 or at a remote location connected to the local office through a network as shown in FIG. 1.

An example premises 102a may include an interface 120. The interface 120 may comprise a modem 110, which may include transmitters and receivers used to communicate on the links 101 and with the local office 103. The modem 110 may be, for example, a coaxial cable modem (for coaxial cable links 101), a fiber interface node (for fiber optic links 101), or any other desired device offering similar functionality. The interface 120 may also comprise a gateway interface device 111 or gateway. The modem 110 may be connected to, or be a part of, the gateway interface device 111. The gateway interface device 111 may be a computing device that communicates with the modem 110 to allow one or more other devices in the premises to communicate with the local office 103 and other devices beyond the local office. The gateway 111 may comprise a set-top box (STB), digital video recorder (DVR), computer server, or any other desired computing device. The gateway 111 may also include (not shown) local network interfaces to provide communication signals to devices in the premises, such as display devices 112 (e.g., televisions), additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
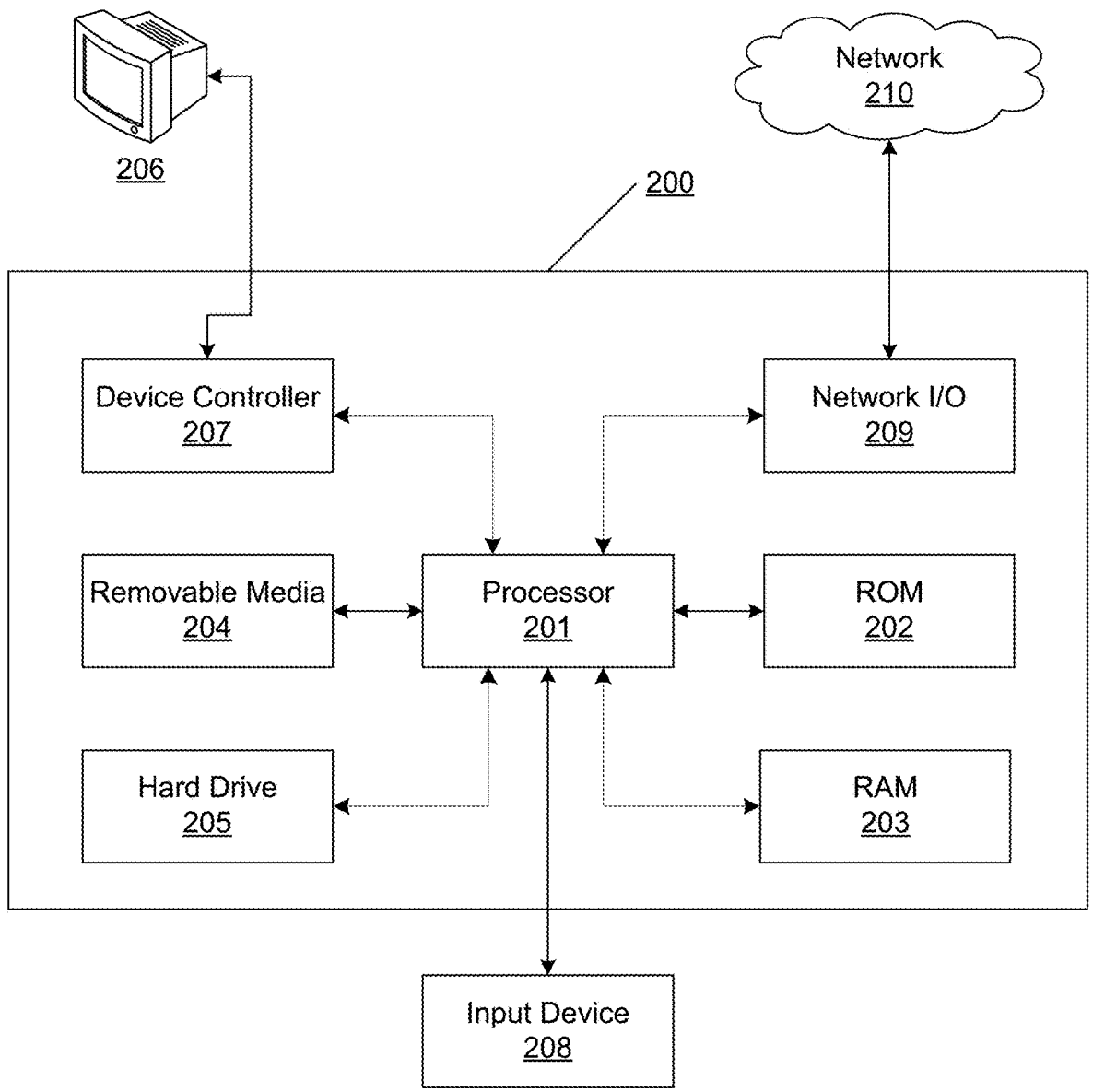
FIG. 2 illustrates an example computing device on which the various elements described herein may be implemented according to one or more aspects described herein.

FIG. 2 illustrates an example computing device on which various elements described herein can be implemented. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links and/or networks illustrated in FIG. 1, or any other desired network.

The FIG. 2 example is an illustrative hardware configuration. Modifications may be made to add, remove, combine, divide, etc. components as desired. Additionally, the components illustrated may be implemented using basic computing devices and components, and the same components (e.g., processor 201, storage 202, user interface, etc.) may be used to implement any of the other computing devices and components described herein.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), application-specific integrated circuits (ASIC), and the like. Particular data structures may be used to more effectively implement one or more aspects of the invention, and such data structures are contemplated within the scope of computer executable instructions and computer-usable data described herein.

Figure 3:
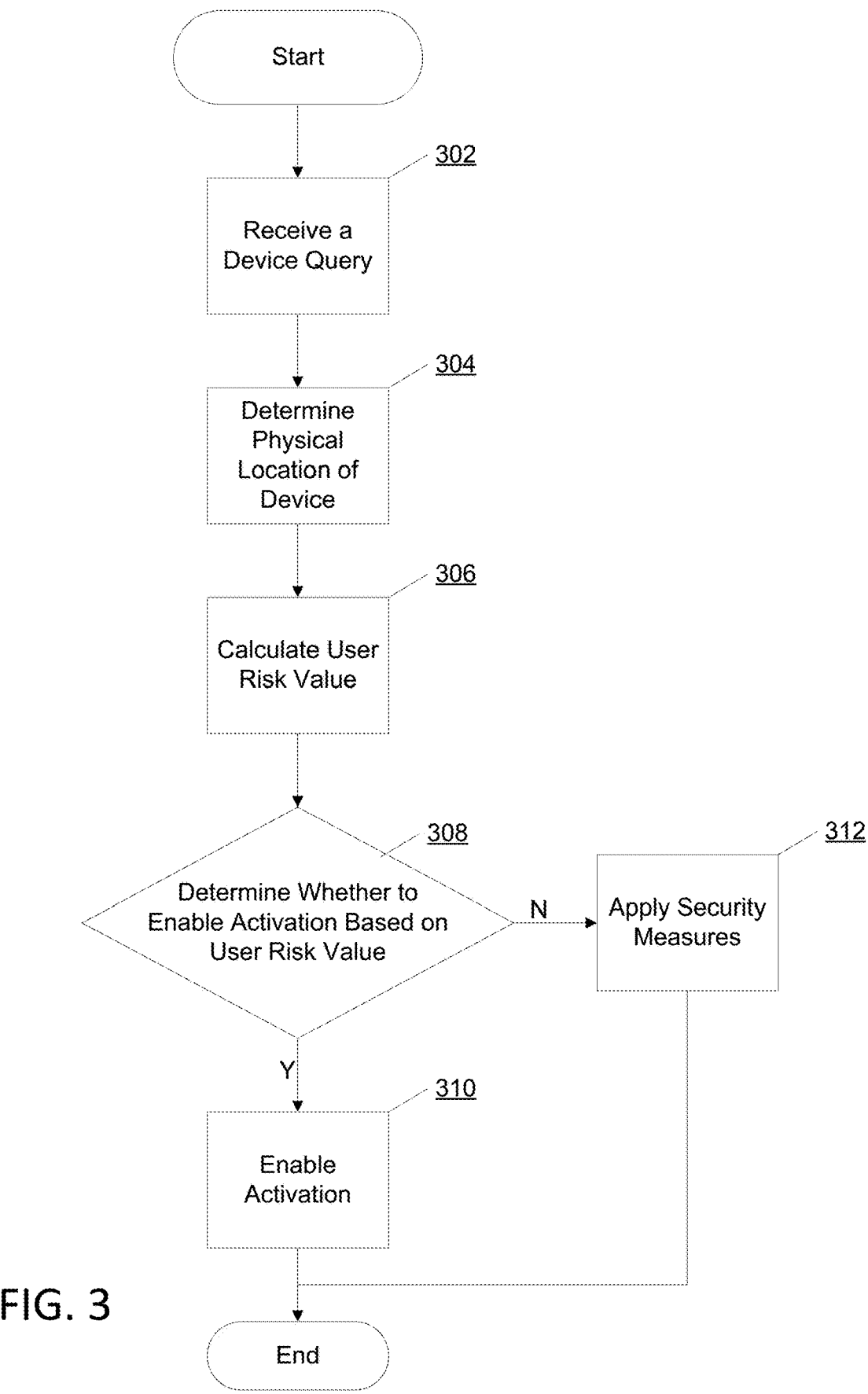
FIG. 3 illustrates an overview of an example process of determining whether to enable a requested activation.

FIG. 3 illustrates an example of a method of dynamically determining the likelihood that a requested activation of a service or device may be an authorized use. At step 302, a query or request may be received from a communication device such as a modem 110, gateway 111, display device 112, set top box 113, personal computer 114, laptop computer 115, or wireless device 116. The communication device may be located in a premises 102a.

The query or request can be a device or service activation request or a provisioning request. The query or request may be directed to an activation server and intercepted by a security server or a routing server. A routing server may be located in a network with a plurality of security servers. The routing server may include an interceptor which intercepts the activation query or request. Based on the geographical location of the incoming request or the current load of the security servers, the routing server may decide the security server to which the request should be sent. This routing functionality may also be included in the security server.

At step 304, the physical or geographical location of the communication device may be determined based on the network connection of the communication device and characteristics of the signal transmitted by the communication device by a location server. At step 306, a security server may calculate a user or subscriber risk value which can be used to proactively determine whether the activation or provisioning query or request is a legitimate query or request based on information associated with the subscriber and/or the communication device. The location server, routing server, and security server may be one of the application servers 107 at the local office 103. Depending on the calculated subscriber risk value, the security server can determine whether to enable activation at step 308. If the subscriber risk value meets an authorized activation level requirement, activation may be enabled at step 310. If the subscriber risk value does not meet an authorized activation level requirement, then security measures may be applied at step 312.

Figure 4:
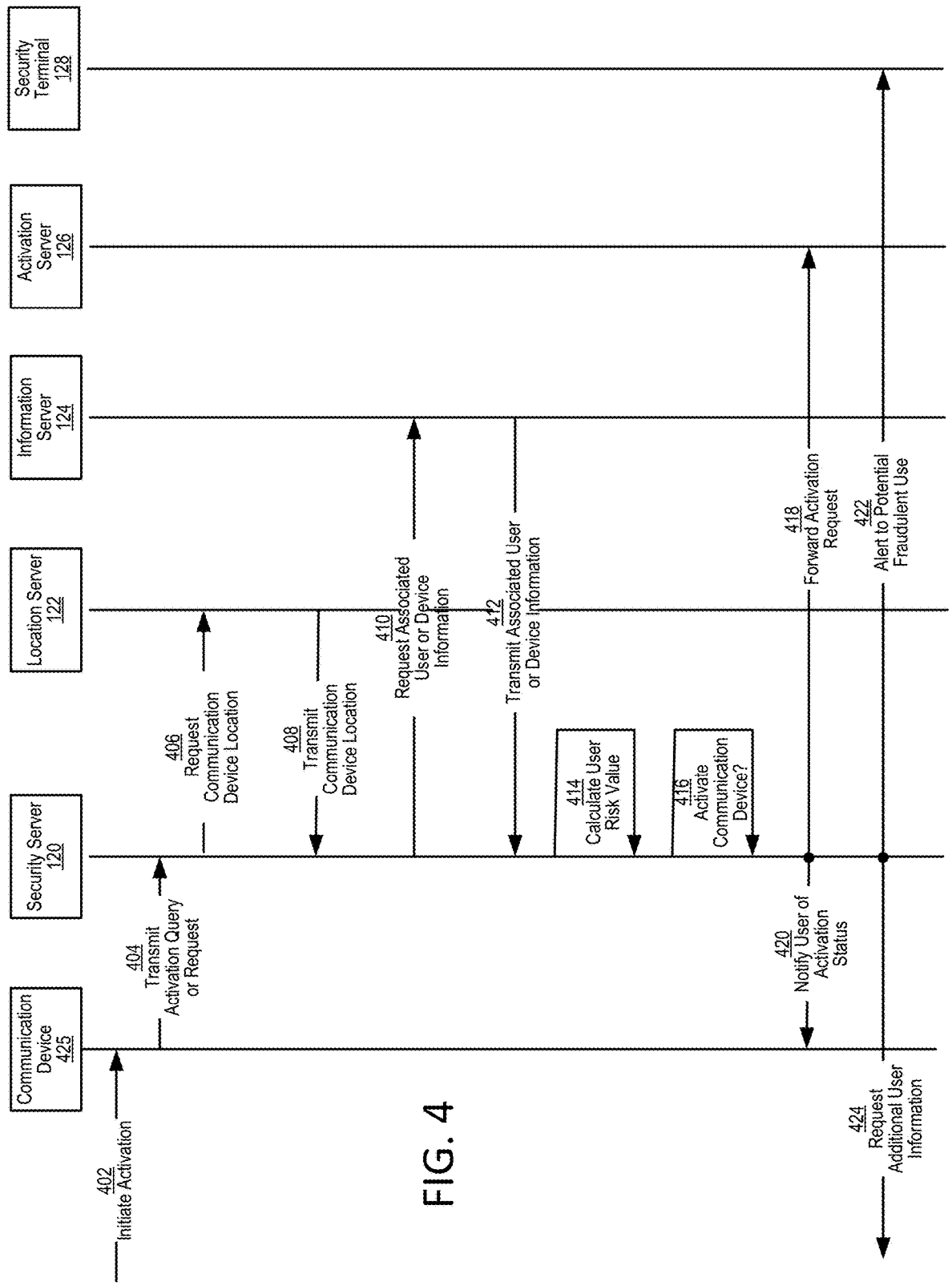
FIG. 4 illustrates an example process flow diagram of determining whether to enable a requested activation between network components

FIG. 4 is an exemplary process flow between network components in determining whether the activation may be enabled. A user at a premises 102a may connect a communication device 425 such as a modem 110 to a network through, for example, a coaxial cable outlet and initiate activation of the communication device 425 on the network at step 402 resulting in a transmission of an activation or provisioning query or request directed to an activation server at 404. The activation query or request 402 may be intercepted by a security server 120 and/or a routing server. In response to the activation query or request 402, the security server 120 may request location information of the modem 110 from a location server 122 at 406. The location server 124 can determine the location of the modem 110 using different types of information which will be described in more detail with respect to FIG. 5 and return location data to the security server at 408.

The security server 120 can also request a variety of information about the user based on location and account information at 410 from a variety of servers or computing devices in the network. This information may be returned to the security server 120 at 412. Based on a variety of factors and information, the security server 120 can calculate a subscriber risk value at 414. Based on the calculated subscriber risk value, the security server can determine whether the communication device or service may be enabled for activation or whether provisioning of service may be enabled at 416.

If the security server 120 has determined that the requested service or the communication device may be activated, the activation request may be released, transmitted, or forwarded to an activation server 126 by the security server 120 at 418. The user may also be notified of the pending activation at 420. If the security server 120 determines that the calculated subscriber risk value indicates potential unauthorized activation, the security server may alert security personnel through a security or user terminal 128 of the potentially fraudulent use at 422 and/or request that the user provide additional information to the service provider at 424 which may be used to recalculate or update the subscriber risk value.

The servers (e.g., security server, location server, information server, and activation server) shown in FIG. 4 may be located in a variety of locations in the service provider's network. For example, the servers may be located at the local office 103.

The method described herein includes a location determination feature and a user risk calculation feature. The location determination feature will be described in detail with respect to FIG. 5 and the subscriber risk calculation feature will be described with respect to FIGS. 6-7.

Figure 5:
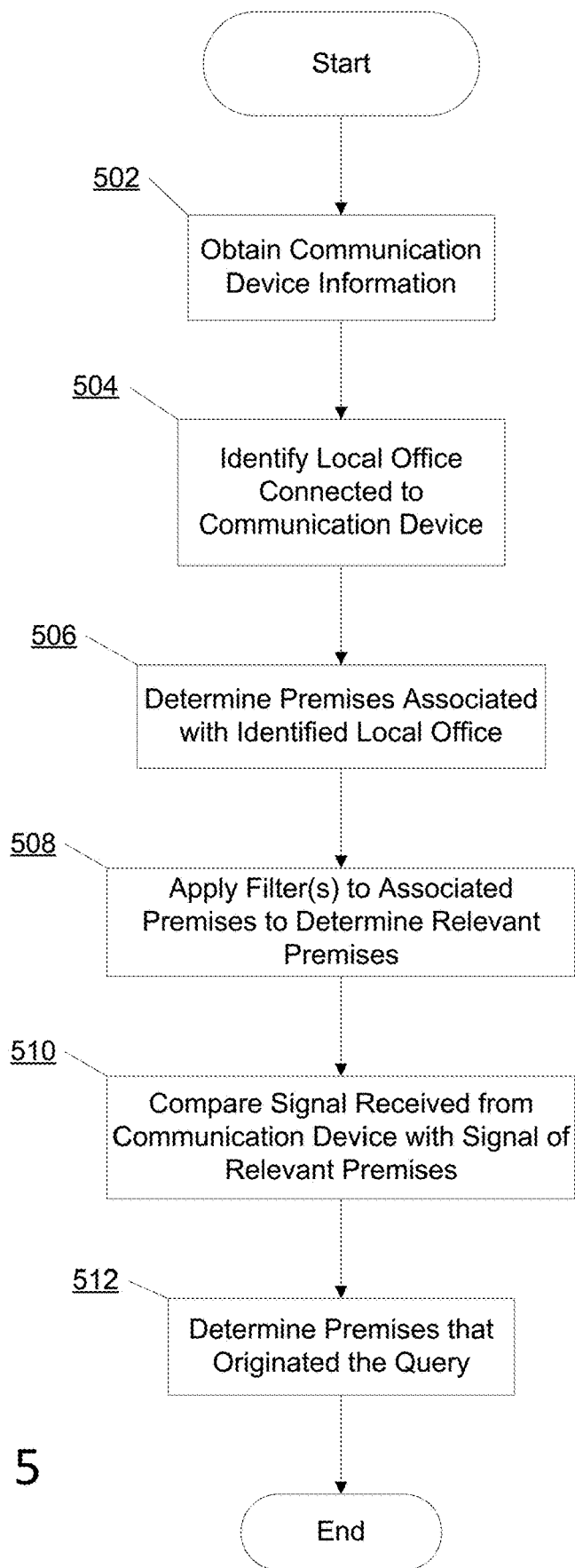
FIG. 5 illustrates an example of a process of determining a communication device location.

FIG. 5 shows a process of location determination which may be completed using a location server 122. At step 502, the communication device is identified and information about the device, for example, a device identifier or device type is obtained. The server can also identify to which local office 103 the communication device is connected at step 504 by determining the TS 104. The TS 104 can be determined from other network components, and from a network communication monitor, the local office 103 can be determined. At step 506, once the local office 103 is determined, a group of premises 102 in which the communication device may be located can be determined since local offices typically serve premises 102 in a specific area such as a certain neighborhood.

At step 508, the group of premises 102 can be further narrowed down by applying filters to remove premises in which it is unlikely that the communication device is located to obtain more relevant premises. For example, from the type of device being activated, it can be determined potentially what type of service is being activated. A modem 110 may indicate the desire to activate internet service and a set top box may indicate a desire to activate a television subscription service. By determining which premises already have activated internet service or based on account information for the premises, premises which already have activated internet service can be filtered out. Another example is to filter out premises which are not scheduled for service activation or are not ready for service activation.

Once the possible premises have been narrowed down to relevant premises, characteristics of the signal from the communication device can be analyzed to determine from which premises the signal is originating. At step 510, the signal received from the communication device may be compared with the signals of relevant premises. The signal may be a wired signal such as a signal transmitted through a cable or a wireless signal. For example, the radio frequency (RF) signal received from the communication device and the RF signals received from premises near an estimated location of the communication device may be compared to determine which RF signals match or closely match those originating from the communication device. The distance between a premises 102a and a local office 103 affect the characteristics of the signal. For wired signals, neighboring premises which have similar distances to the local node 103 will likely produce signals with similar characteristics. For example, spectral characteristics and/or power characteristics of the RF signals may be compared to determine how closely the signals resemble each other.

As another example, a heartbeat or signature may be included in the RF signal as a signal identifier. To determine the location from which the communication device signal is originating, the heartbeats or signatures of the communication device signal and the relevant premises may be compared.

Based on a match or closest match, an originating premises for the signal from the communication device may be determined or estimated at step 512. The location information of the originating premises may be a street address or a coordinate location such as the latitude and longitude of the originating premises.

Figure 6:
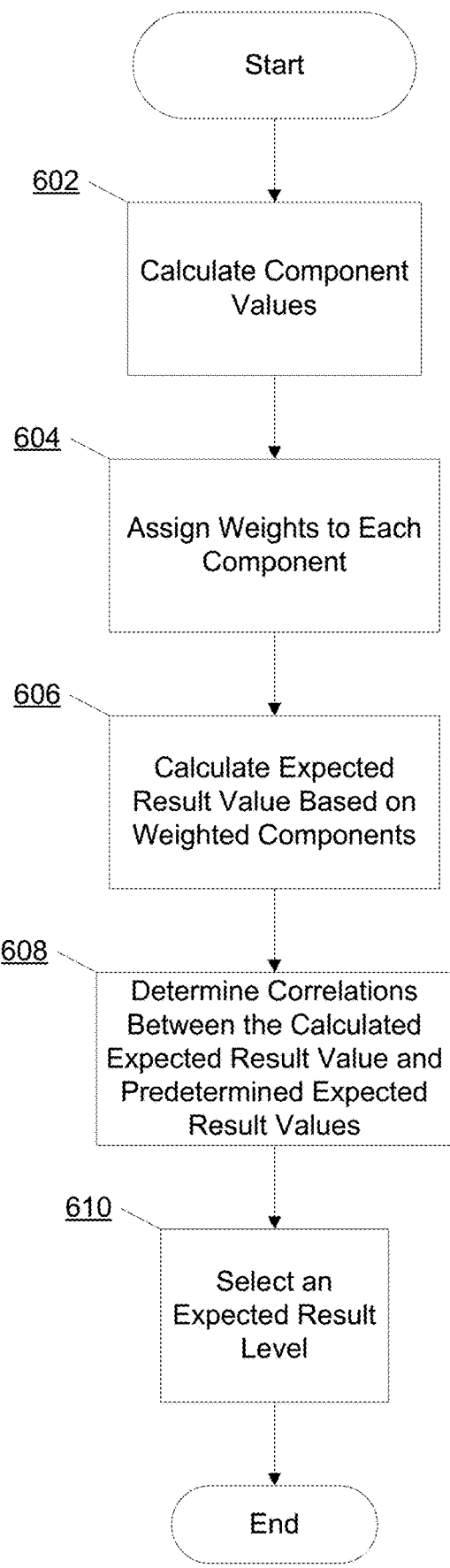
FIG. 6 illustrates an example of a process of selecting an estimation result level.

With respect to the feature of user or subscriber risk value calculation, FIG. 6 is a flow diagram showing an overview of a process of determining or predicting user behavior based on collected data associated with a user. At step 602, a plurality of components may be calculated. For example, a variety of individual components may be used in the calculation. As another example, the components may be comprised of sub-components, or the components may be grouped into different categories or primary components such as a device component, a network component, a location component, an account component, and a finance component. At step 604, a weight can be assigned to each component depending on the strength of the correlation between the component and an expected result. The expected result value can be calculated based on the weighted components at step 606. At step 608, the expected result value, which may be in the form of a score or graphical pattern, is compared to predetermined behavior scores or patterns to determine correlations between the estimated result and the predetermined scores or patterns. Depending on the correlation strengths, an expectation level is selected at step 610 that provides information on the likelihood of a user behavior or an event occurring.

The process illustrated in FIG. 6 is advantageous in that a result can be dynamically determined, for example, to provide information for immediate or real-time decision making. Furthermore, the process shown in FIG. 6 is dynamic or adaptable in that the estimation level or model may respond to new or different information to provide updated results.

Figure 7:
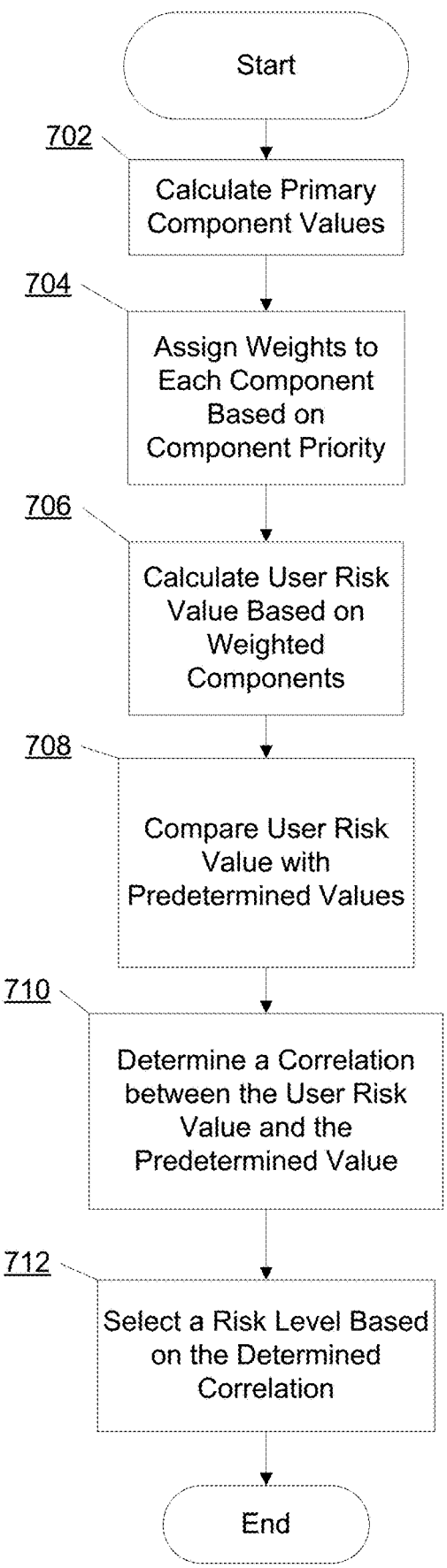
FIG. 7 illustrates an example of applying the exemplary process of FIG. 6 to determining a risk level.

Turning to FIG. 7, FIG. 7 shows an example of applying the process of FIG. 6 to determining whether an activation query or request would be an authorized activation or a fraudulent activation based on the probability or degree of risk associated with the activation query or request.

At step 702, the user or subscriber risk value may be based on one or more primary components whose scores are calculated at step 702. There may be five primary components such as a device component, a network component, a location component, an account component, and a finance component. Each of the primary component values may be calculated based on various subcomponents.

The device component may be calculated based on subcomponents including the device's activation history, a device type, a device identifier, boot or configuration file, number of associated accounts, and device history. The device identifier may be a MAC address, serial number, or an International Mobile Equipment Identity (IMEI) number. For example, if the device has been activated on numerous accounts within a short period of time, such an activation history may indicate abuse or unauthorized use. The activation history may be determined by the number of IP addresses associated with the device within a given time period. A MAC address which is not associated with a known vendor may also indicate potentially unauthorized use or an unauthorized device. A boot file or configuration file having a class of service which does not correspond to traffic rates may suggest unauthorized use or an unauthorized device. Having one device listed on multiple account may also suggest unauthorized use or an unauthorized device. A blacklisted device may further indicate fraudulent use. Based on these subcomponents, the device component value may reflect the degree to which the activation history suggests abuse or unauthorized use.

The network component value may be based on the Internet Protocol (IP) address, CMTS connection, Dynamic Host Configuration Protocol (DHCP) information, Simple Network Management Protocol (SNMP) information, boot or configuration file information, MAC address, and head-end information. The network information gathered from the communication device from which the activation request originated may be compared to previously stored network information. The network information may be associated with the account for which activation is requested. Conflicting gathered network information and stored network information may indicate a greater likelihood of an unauthorized or fraudulent activation. The security server may also store network information which has been previously associated with fraudulent activation. For example, the security server may store IP addresses from which fraudulent requests have previously originated.

The location component may be calculated based on information associated with the identified location of the device or the associated account. For example, if the determined device location does not match the service location list in the account, such a discrepancy may suggest fraudulent service usage. Frequent high-risk financial component values, account component values, or device component values associated with the particular device location may also suggest fraudulent usage. A communication device being located in a foreclosed premises may also suggest unauthorized or fraudulent usage.

The account component may be calculated based on whether the account is in good standing and the account history. For example, having a large number of devices associated with an account or having a blacklisted account may indicate a high potential of unauthorized or fraudulent usage. An account may be blacklisted based on a history of non-payments or late payments or based on a previous instance of unauthorized usage. An account associated with the user or the activation request may be determined based on identifying information including a street address, social security number, telephone number, e-mail address, IP address, and MAC address.

The finance component may be calculated based on the user's financial information such as whether previous account payments were late, whether the balance was paid in full, and the credit score of the user or account holder. For example, late payments and a poor credit score may suggest a greater likelihood of an unauthorized activation.

Each component value may be a numerical value which reflects a risk of fraudulent activity based on the size of the numerical value. For example, the larger the numerical score for each component the greater the likelihood that the activation may be fraudulent. Conversely, a smaller numerical value may also be used to signal a higher risk of fraudulent activity.

At step 704, weights are assigned to each individual primary component. A primary component may be weighted more heavily if the calculated component value indicates a strong likelihood that the activation may be a fraudulent activation or anomalous behavior. For example, if a communication device is associated with a large number of accounts within a short period of time, such behavior may suggest unauthorized or fraudulent use. To account for a strong suggestion of unauthorized or fraudulent use, the device component may be weighted more heavily than the other components. Other components may also be weighted more heavily if behavior or information associated with the corresponding components is associated with a strong suggestion of unauthorized or fraudulent use.

The weights may be distributed equally among the primary components and may be in the form of percentages or numerical values. For example, when five primary components are used in the subscriber risk score calculation, each primary component may be assigned a weight of 25% such that each primary component is weighted equally. In the case of heavier weighting for anomalous behavior or a strong suggestion of unauthorized use associated with a component, for example, the finance component, the finance component may be assigned a much heavier weight compared to the other primary components. For example, the finance component may be assigned a weighting of at least 50% while the remaining primary components are weighted equally or weighted according to their respective unauthorized usage potential.

Business rules may also dictate that certain behaviors or primary component values are anomalous and considered to provide a clear indication of fraudulent use or an unreasonable risk of fraudulent use. A combination of values or behavior across different components may be used in detecting anomalous behavior. For example, an activation request originating from a foreclosed premises combined with an activation request originating from a communication device having a MAC address associated with an account different than the account associated with the request may be considered anomalous. Default primary component weights may be used, and the weights of individual primary components containing anomalous behavior can be adjusted to be more heavily weighted. Another way of implementing consideration of business rules can be to apply a filter for subscriber risk values which meet certain business rules for anomalous behavior and disabling activation for subscriber risk values captured by the filter. One or more components may be filtered at a time.

Certain behavior or component scores or combinations of behavior and component scores which may be considered to automatically indicate an unreasonable risk of fraudulent usage may be taken into account in the subscriber risk score by heavily weighting the corresponding component or components. An exceptionally high risk based on anomalous behavior or component scores may result in automatically indicating the subscriber risk score to correspond to a high risk.

Figure 10:
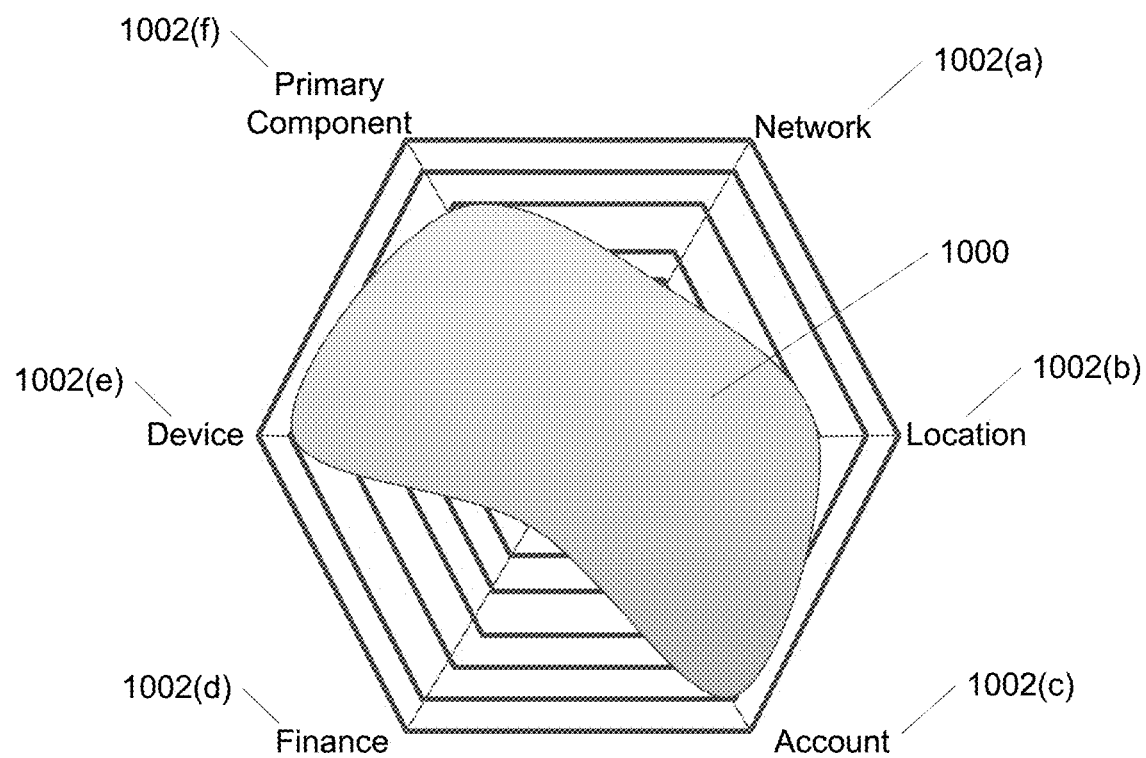
FIG. 10 provides an example of a subscriber risk pattern.

At step 706, once the weights are assigned, the subscriber risk value can be calculated based on the individual primary components and their relative weightings. The user or subscriber risk value may be in the form of a score or a graphical pattern. The subscriber risk score may be a number value within a range which indicates the degree to which the activation may potentially be unauthorized or fraudulent. A user or subscriber risk pattern may be, for example, a two-dimensional pattern which displays the values of the individual components overlaid on a graph or chart to show relationships between the individual components where the individual component scores inform the shape of the pattern. An example of a subscriber risk pattern is shown in FIG. 10. A filter for business rules may also be applied to the subscriber risk pattern to detect for a pattern that meets certain business rules for anomalous behavior.

As described previously, each individual component may be composed of a plurality of subcomponents. Similar to the use of primary component values in determining the subscriber value, the subcomponent values may be weighted depending on importance in the calculation to determine the corresponding individual component value.

At step 708, a subscriber risk value may be compared to at least one predetermined value. A predetermined value may be in the form of a score, a score range, or a graphical pattern, and each predetermined score, score range, or graphical pattern may indicate the likelihood that the activation request is an unauthorized request. For example, a first predetermined score, score range, or pattern may indicate a high risk or probability that the activation request is a fraudulent request. The first predetermined score, score range, or pattern may be based on scores or patterns of confirmed instances of fraudulent use. A second predetermined score, score range, or pattern may indicate a known medium risk or probability that the activation request is a fraudulent request. For example, a medium risk may indicate potentially fraudulent use. A third predetermined score, score range, or pattern may indicate that the activation request is unlikely to be fraudulent and may be categorized as non-fraudulent. It is noted that any number of predetermined scores, score ranges, or patterns may be used depending on the level of detail desired.

At step 710, a correlation is determined between the subscriber value and the predetermined values by comparing the subscriber value to a predetermined value. The correlation provides information on the proximity of the score to a predetermined score or the degree to which the calculated graphical pattern matches the predetermined graphical pattern. The correlation may be determined based on if the score matches the predetermined score within a target percentage or meets a threshold of the predetermined score. The correlation may also be determined based on whether the score falls within the predetermined score range. For example, on a scale of 0-100, a subscriber value between 75-100 may be considered to be a high risk. A subscriber value between 25-74 may be considered to be a medium risk, and a subscriber value between 0-24 may be considered to be a low risk. The levels of high, medium, and low risks are used as examples, and a skilled person would appreciate that any number of risk levels may be used. For a graphical pattern, the correlation may be determined based on how closely the shape or contours of the pattern match those of a predetermined pattern and/or the surface area of the pattern.

At step 712, a risk level such as a high risk level, a medium risk level, or a low risk level can be selected based on the correlation that is, for example, the strongest. As an example, if the correlation of the subscriber score or pattern is strongest to the high risk score or pattern, the activation request may be found to be high risk. In another example, the activation request may be associated with a high risk if the subscriber risk score associated with the activation request falls within the high risk score range.

Figure 8:
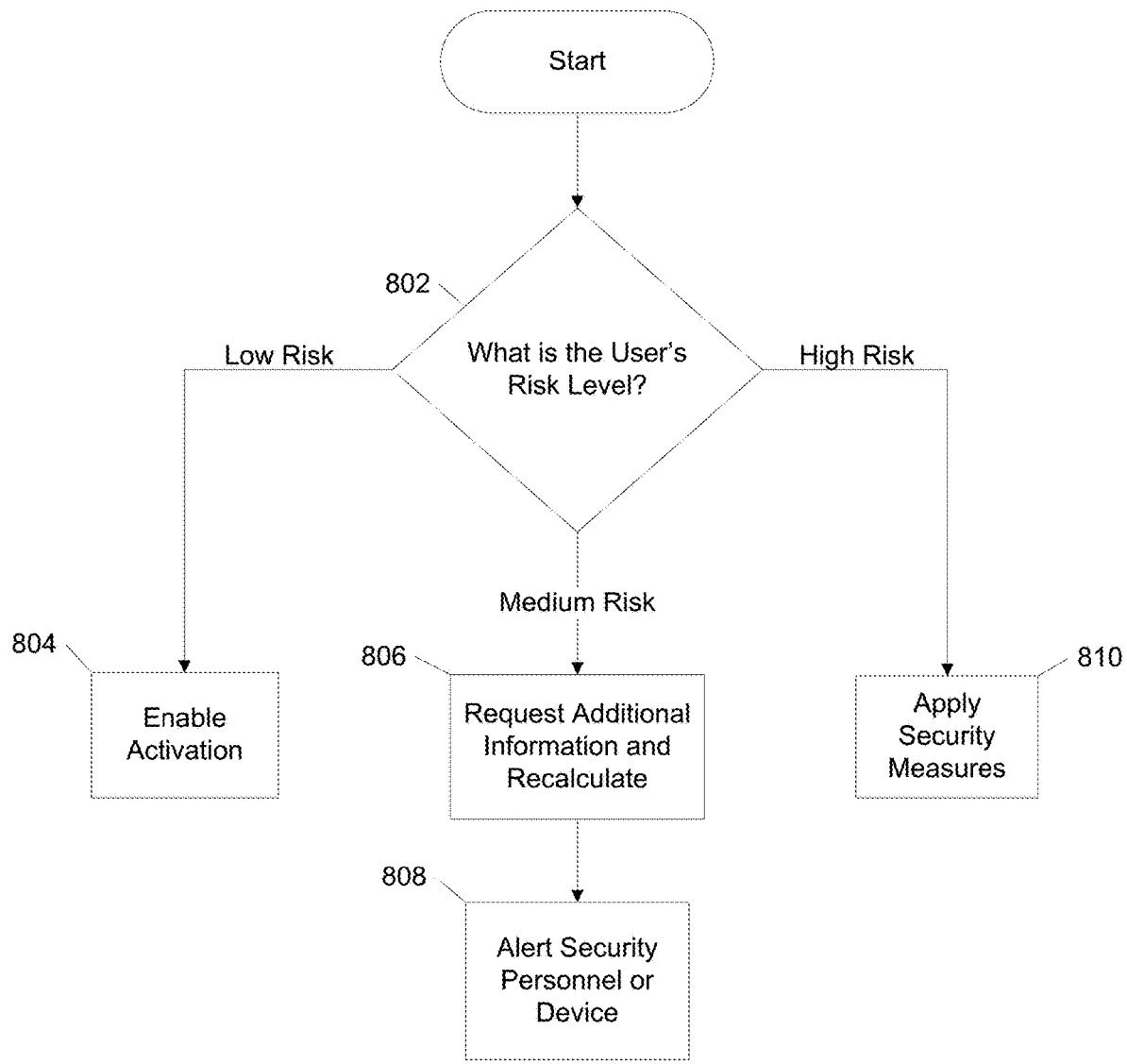
FIG. 8 illustrates an example chart of available options based on a determined risk level.

FIG. 8 shows possible action options based on the selected risk level. At step 802, the user's risk level which was determined in the method illustrated in FIG. 7 is evaluated. If the user is considered to be a low risk for fraud, then activation can be enabled at step 804. If the activation is considered to be medium risk, then the security system may request additional information from the user at step 806 to recalculate the subscriber risk value. A user terminal 128 can receive an alert regarding the medium risk subscriber and other security measures can be applied at step 808. If the activation is considered to be high risk, security measures may be applied at step 810. The applied security measures may include flagging the account, alerting security personnel, denying activation, and requesting the user contact security personnel to resolve any security issues. Security personnel may have a user interface on the user terminal 128 which provides information on the calculated subscriber value to assist the security personnel in resolving the security issue such as a fraud check screen.

Figure 9:
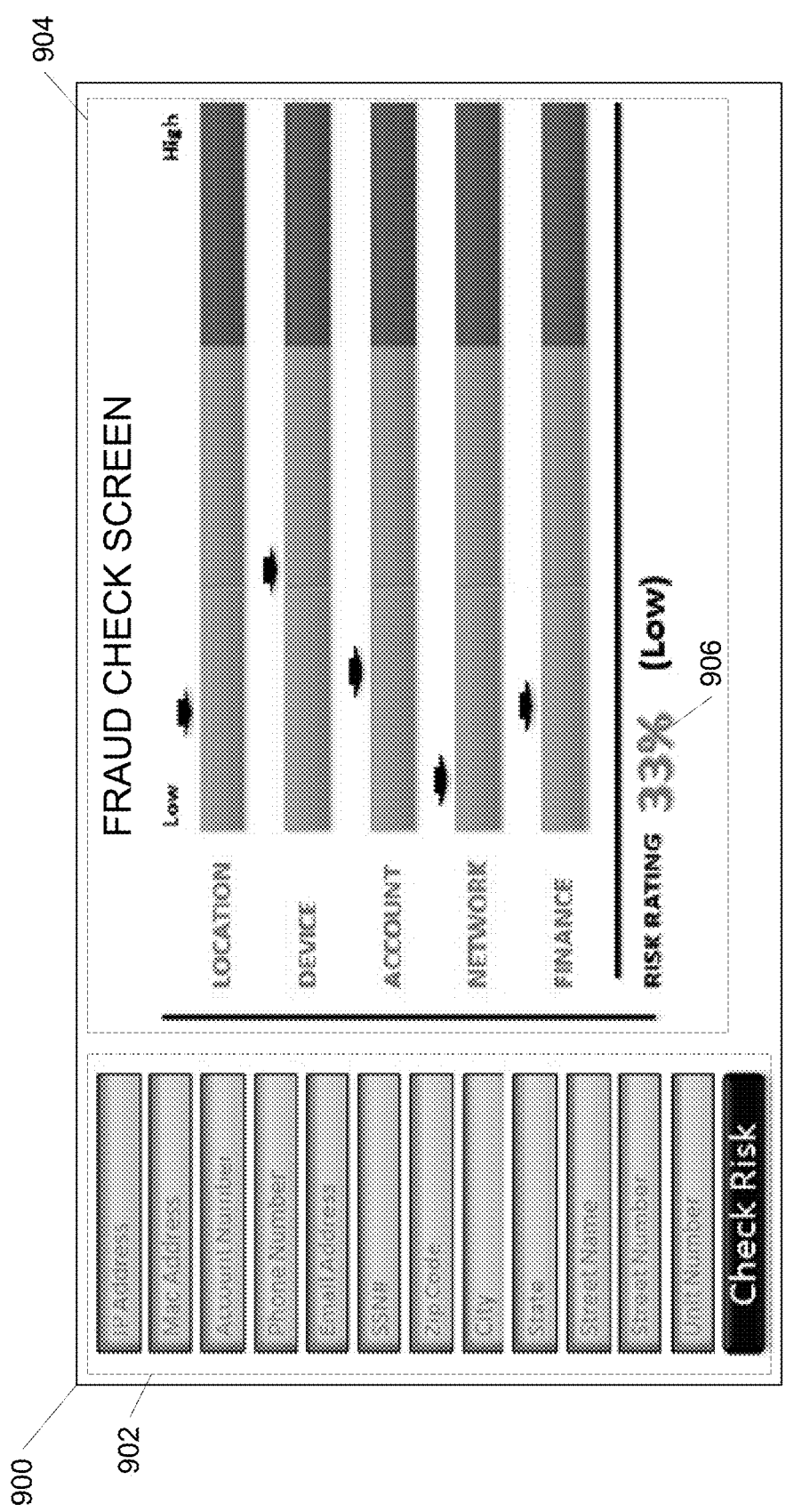
FIG. 9 provides an example of a fraud check screen.

FIG. 9 shows an example of a fraud check screen 900. An agent may enter the user's information in input area 902 and be provided with an immediate risk rating in area 904. For example, inputted information may include information associated with the user such as a IP address, MAC address of a requesting device, account number, phone number, e-mail address, social security number, and street address information. As described herein, the subscriber value may comprise a number of primary components. FIG. 9 shows the use of the previously discussed location component, device component, account component, network component, finance component, and a risk score. Based on entered and other received information, the fraud check screen may provide a graphical representation 904 (e.g., graph, chart, subscriber risk pattern) of the component scores and the overall subscriber risk score 906. The graphical representation may provide the agent with information of the risk level indication of each individual component. Since the subscriber risk value is calculated dynamically in real-time, security personnel are able to receive immediate feedback based on existing or newly entered information as to whether the potential service activation is likely to be unauthorized and to proactively check for fraudulent usage. Additionally, users benefit from an immediate decision as to whether activation of a device or service will be allowed. The location aware security system is also advantageous since much of the information used in the subscriber risk value may be collected based on existing information or information otherwise available without requiring the user to provide information at or before the time of activation or the request for activation.

FIG. 10 illustrates an example of a calculated subscriber risk pattern 1000. The pattern 1000 may be overlaid on a graph having an axis for each primary component. The axes may extend from a central point and be evenly spaced radially. In the example graph, six primary components 1002(*a*)-(*f*) are used such that the graph may have the shape of a hexagon. Each primary component score may be plotted along the axis of the respective primary component. For example, the previously discussed primary components of network, location, account, financial, and device are provided with an axis. A lower primary component score, which may indicate a lower risk of fraudulent activity, may be located nearer the center of the graph and a higher primary component score, which may indicate a higher risk of fraudulent activity, may be plotted closer to an edge of the graph. By connecting the plotted points, a pattern is produced. Relationships between values of primary components may determine the shape of a line connecting various plotted points.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, the steps illustrated in the illustrative figures may be performed in other than the recited order, and one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

The invention claimed is:

1. A method comprising:
receiving, by a computing device, a request for a service associated with a first user device;
estimating a geographical location of the first user device by comparing a signal received from the first user device with at least one of a plurality of signals received from a plurality of user devices associated with different geographical locations, wherein the signal received from the first user device is a wired network signal received via a wired network connecting the computing device to the first user device, and wherein the plurality of signals are wired network signals received via the wired network; and
activating, based on the estimated geographical location of the first user device, the service.

2. The method of claim 1, wherein the comparing comprises comparing spectral characteristics of the signal received from the first user device with spectral characteristics of each of the plurality of signals received from the plurality of user devices.

3. The method of claim 1, wherein the comparing comprises comparing power characteristics of the signal received from the first user device with power characteristics of each of the plurality of signals received from the plurality of user devices.

4. The method of claim 1, further comprising:
determining, by the computing device and based on the estimated geographical location, a security level associated with the first user device, wherein the activating is based on comparing the security level associated with the first user device with a threshold value.

5. The method of claim 4, wherein the determining of the security level is further based on account status information associated with the first user device.

6. The method of claim 1, further comprising determining the plurality of user devices by filtering a group of candidate user devices based on a type of the first user device.

7. The method of claim 1, further comprising determining the plurality of user devices by filtering a group of candidate user devices based on a determination of one or more premises scheduled for service activation.

8. The method of claim 1, wherein each of the plurality of user devices is associated with an activated service.

9. The method of claim 1, wherein the estimated geographical location comprises a street address of a first premises in which the first user device is located.

10. An apparatus comprising:
one or more processors; and
memory storing instructions that, when executed by the one or more processors, cause the apparatus to:
receive a request for a service associated with a first user device;
estimate a geographical location of the first user device by comparing a signal received from the first user device with at least one of a plurality of signals received from a plurality of user devices associated with different geographical locations, wherein the signal received from the first user device is a wired network signal received via a wired network connecting the apparatus to the first user device, and wherein the plurality of signals are wired network signals received via the wired network; and
activate, based on the estimated geographical location of the first user device, the service.

11. The apparatus of claim 10, wherein the instructions, when executed by the one or more processors, cause the apparatus to compare the signal received from the first user device with the at least one of the plurality of signals received from the plurality of user devices associated with different geographical locations by performing one or more of:
comparing spectral characteristics of the signal received from the first user device with spectral characteristics of each of the plurality of signals received from the plurality of user devices;
comparing power characteristics of the signal received from the first user device with power characteristics of each of the plurality of signals received from the plurality of user devices;
comparing a heartbeat included in the signal received from the first user device with heartbeats included in each of the plurality of signals received from the plurality of user devices; or
comparing a signature included in the signal received from the first user device with signatures included in each of the plurality of signals received from the plurality of user devices.

12. The apparatus of claim 10, wherein the instructions, when executed by the one or more processors, cause the apparatus to:
determine, based on the estimated geographical location and based on account status information associated with the first user device, a security level associated with the first user device; and
activate the service by activating, based on comparing the security level associated with the first user device with a threshold value, the service.

13. The apparatus of claim 10, wherein the instructions, when executed by the one or more processors, cause the apparatus to determine the plurality of user devices by filtering a group of candidate user devices based on a type of the first user device, based on a determination of one or more premises scheduled for service activation, or based on a combination thereof.

14. One or more non-transitory computer readable media comprising instructions that, when executed, cause:
receiving a request for a service associated with a first user device;
estimating a geographical location of the first user device by comparing a signal received from the first user device with at least one of a plurality of signals received from a plurality of user devices associated with different geographical locations, wherein the signal received from the first user device is a wired network signal received via a wired network, and wherein the plurality of signals are wired network signals received via the wired network; and
activating, based on the estimated geographical location of the first user device, the service.

15. The one or more non-transitory computer readable media of claim 14, wherein the instructions, when executed, cause comparing the signal received from the first user device with the at least one of the plurality of signals received from the plurality of user devices associated with different geographical locations by causing one or more of:
comparing spectral characteristics of the signal received from the first user device with spectral characteristics of each of the plurality of signals received from the plurality of user devices;
comparing power characteristics of the signal received from the first user device with power characteristics of each of the plurality of signals received from the plurality of user devices;
comparing a heartbeat included in the signal received from the first user device with heartbeats included in each of the plurality of signals received from the plurality of user devices; or
comparing a signature included in the signal received from the first user device with signatures included in each of the plurality of signals received from the plurality of user devices.

16. The one or more non-transitory computer readable media of claim 14, wherein the instructions, when executed:
cause determining, based on the estimated geographical location and based on account status information associated with the first user device, a security level associated with the first user device; and cause the activating by causing activating, based on comparing the security level associated with the first user device with a threshold value, the service.

17. The one or more non-transitory computer readable media of claim 14, wherein the instructions, when executed, cause determining the plurality of user devices by filtering a group of candidate user devices based on a type of the first user device, based on a determination of one or more premises scheduled for service activation, or based on a combination thereof.

\* \* \* \* \*

UNITED STATES PATENT AND TRADEMARK OFFICE
CERTIFICATE OF CORRECTION

| | | |
|---|---|---|
| PATENT NO. | : 11,265,386 B2 | Page 1 of 1 |
| APPLICATION NO. | : 16/674114 | |
| DATED | : March 1, 2022 | |
| INVENTOR(S) | : James C. Taylor et al. | |

It is certified that error appears in the above-identified patent and that said Letters Patent is hereby corrected as shown below:

In the Specification

Detailed Description, Column 3, Line 60:
Delete "HTMLS," and insert --HTML5,--

Detailed Description, Column 6, Line 17:
Delete "124" and insert --122--

Signed and Sealed this
Twentieth Day of June, 2023

Katherine Kelly Vidal
*Director of the United States Patent and Trademark Office*